No. 733,143. PATENTED JULY 7, 1903.
J. CALLOW.
APPARATUS FOR DIVIDING AND COMPRESSING OR MOLDING DOUGH.
APPLICATION FILED NOV. 24, 1902.
NO MODEL. 2 SHEETS—SHEET 1.
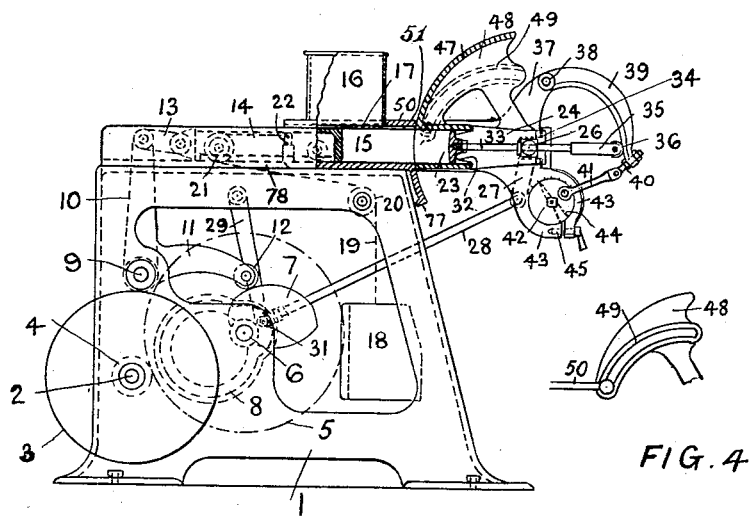
FIG. 1.
FIG. 4.
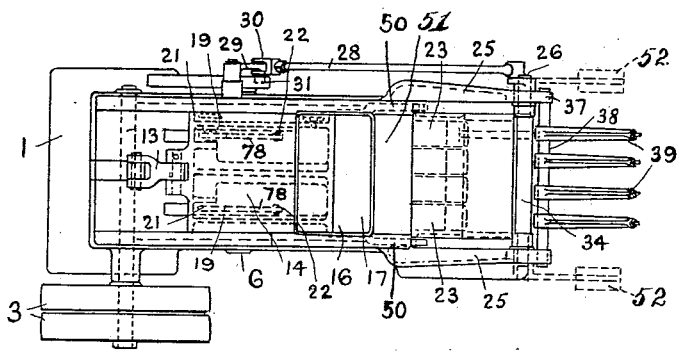
FIG. 2.
Witnesses. Inventor.

No. 733,143. PATENTED JULY 7, 1903.
J. CALLOW.
APPARATUS FOR DIVIDING AND COMPRESSING OR MOLDING DOUGH.
APPLICATION FILED NOV. 24, 1902.
NO MODEL. 2 SHEETS—SHEET 2.
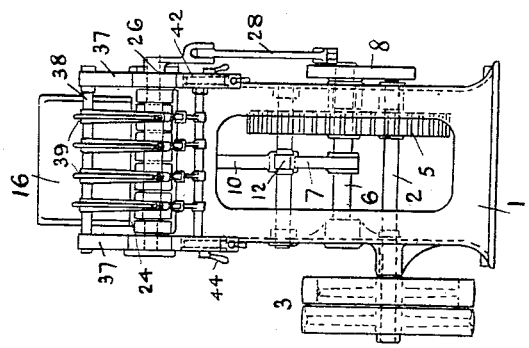
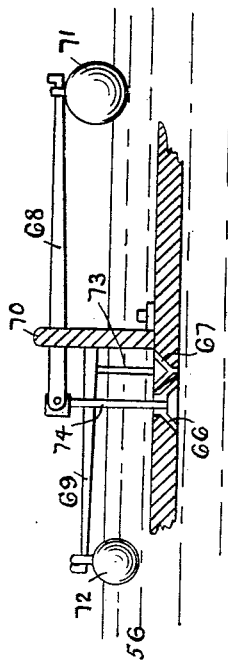

No. 733,143. Patented July 7, 1903.

UNITED STATES PATENT OFFICE.

JOHN CALLOW, OF LIVERPOOL, ENGLAND.

APPARATUS FOR DIVIDING AND COMPRESSING OR MOLDING DOUGH.

SPECIFICATION forming part of Letters Patent No. 733,143, dated July 7, 1903.

Application filed November 24, 1902. Serial No. 132,624. (No model.)

*To all whom it may concern:*

Be it known that I, JOHN CALLOW, foreman baker, a subject of the King of Great Britain, residing in Liverpool, in the county of Lancaster, England, (whose full postal address is 2 Rokeby street, Liverpool, aforesaid,) have invented certain new and useful Improvements in Apparatus for Dividing and Compressing or Molding Dough and Like Plastic Materials, (for which application has been made in England, in part, No. 9,628, dated April 25, 1902,) of which the following is a specification.

This invention has for its object an apparatus for dividing dough or like plastic material into compressed lumps of predetermined size or shape and weight and discharging said lumps intermittently. For this object a plunger is provided which reciprocates in a suitably-formed chamber having an inlet-hopper and discharges a predetermined amount of plastic material at each forward stroke into one, two, or more receivers, which latter during the return of the plunger discharge the lumps so received and are ready for a fresh charge when the plunger moves forward again.

The invention is shown in the accompanying drawings, in which—

Figure 1 represents a side elevation, partly in section, of the machine. Fig. 2 is a plan view thereof. Fig. 3 is a rear end elevation of Fig. 1. Fig. 4 is a detail view of part of the machine. Figs. 5 and 6 show two shapes for the receivers. Fig. 7 shows a modified form of actuating-gear for the plunger, and Fig. 8 shows a portion of Fig. 7 on an enlarged scale.

In the lower part of a framework 1 is mounted a pulley-shaft 2, which carries fast and loose pulleys 3 outside the framework and a pinion 4, Fig. 1, within said framework. Pinion 4 gears with a toothed wheel 5, and this latter is mounted on a shaft 6, which constitutes the principal actuating mover of the machine. On shaft 6 is a cam 7, Figs. 1 and 3, which is designed to operate the plunger, and a second groove-cam 8, which operates the receivers.

On a shaft 9 an elbow-lever 10 11 is mounted, the arm 11 of which carries a roller 12, which bears upon cam 7, and arm 10 is connected by a link 13 to a broad plunger 14. This plunger is approximately rectangular, preferably made hollow, as shown in Figs. 1 and 2, and having strengthening-ribs, which are indicated in dotted lines, although of course any other suitable form of plunger might be used. The plunger works in a chamber 15 beneath a hopper 16, to which latter the materials are suitably fed.

17 is a cut-off plate which comes forward as the plunger 14 advances and separates the plastic material in the hopper from the portion which is being pressed forward by the plunger in the chamber 15. The means for operating the plate 17 is connected with the receivers and will be described in relation thereto.

A weight 18 is hung in the frame 1 by means of bands or chains 19, which pass over pulleys 20 in the framework and 21 on the plunger and are fastened to posts 22, which are mounted on the bottom of the chamber 15, Fig. 1, and project into the bottom of the plunger, as shown. Slots 78 allow the bands 19 to work through the bed-plate of the chamber while moving the plunger forward. The effect of this weight and connections is thus to press the plunger forward with a constant force or pressure, the reverse motion being brought about by the elbow-lever and cam acting in opposition to the weight.

The receivers 23 are either square or round, as indicated in Figs. 5 and 6, and the required number of them (four in this case) are mounted in a framework 24, which is capable of partially rotating around pivots 26 in the brackets 25 of the frame 1. On one of the pivots 26 an arm 27 is fixed, and a rod 28 is hinged to the end of this arm, its other end being hinged to a link-arm 29, which is hung from the frame 1. At the connection-point 30 between the arms 28 and 29 is arranged a roller-pin or the like, 31, which works in the groove of cam 8. As the cam rotates the rod 28 is drawn backward and pushed forward at intervals, turning the receivers 23 down and raising them again to the position opposite the ends of the cylinders. Pistons 32 are arranged one in each receiver 23, and rods 33 from these pistons pass through a guide 34 in frame 24 and end in forks 35, carrying rollers 36. At the sides of brackets 25 arms 37 project upward and carry a cross-shaft 38. On this shaft are as many curved arms 39 as there are receivers 23, each arm being opposite the end of one of the receivers. The ends of arms 39 are connected by links 40 41 to a cross-rod 46, the ends of which fit in the faces of two disks 42, which are mounted in split rings 43 under the brackets 25. The disks are provided with handles 44, by which they may be turned, and the screw-pins 45 serve for tightening the rings around the disks and locking the latter. The rollers 36 bear upon the inner edges of the curved arms 39, and as the receivers are tilted downward by the rod 28 the rollers travel over the arms 39, thus gradually forcing the pistons 32 toward the mouths of their receivers. By turning the disks 42 it will be seen that the links 40 41 are drawn inward, bringing with them the curved arms 39, and consequently reducing the distance which pistons 32 can move back in their receivers and the amounts which those receivers will then hold. The rings may be graduated, if desired, at the edges near the disks, Fig. 1, and an arrow on each disk will then point to the graduation corresponding to the volume of the receivers, or, if preferred, to the weight of a particular material, such as dough, which will enter each receiver when the disk is turned to a given position. A plate 47, curved to the arc of a circle around the pivots 26, serves to close the mouths of the receivers while these latter are turned down for discharging. The upper parts of the plate are supported by side pieces or plates 48, which rigidly connect it with the tilting framework 24, and each plate 48 has an eccentric groove 49 therein. Rods 50, connected to the cut-off plate 17, are provided with pins or rollers which engage in these grooves 49, the arrangement being such that the plate 17 is drawn by the rods 50 and grooves 49 away from the opening of the hopper into a recess 51 when the frame 24 tilts and is returned into the position shown in Figs. 1 and 2 by the action of the grooves and rods when the frame 24, with the receivers, is brought back again into the receiving position.

Fig. 4 shows a plate 48, groove 49, and rod 50 as seen from the front.

Weighted arms 52 (shown in dotted lines in Fig. 2) may, if desired, be attached to the receiver-framework 24 behind the pivots 26 in order to assist in returning the said framework and the receivers after discharge; but their use is not essential when a groove-cam, such as 8, is used. A scraper 77 is provided for scraping all the material off the faces of the pistons 23 during the rise of the receivers.

The receivers 23 may be either square, as shown in Fig. 5, or round, as shown in Fig. 6. The latter shape is only suitable in case the plastic material is very soft and will readily adapt itself to the shape of its receiver.

The action of the apparatus is as follows: Supposing the plunger 14 is being drawn back, the plastic material will be falling from the hopper 16 into chamber 15. The receivers will have been turned down or tilted, and as the plunger reaches the rear end of its course the receivers will be raised and the cut-off plate 17 forced in, so as to divide the chamber 15 from the material in the hopper. The receivers are now in position for receiving their charges; but their pistons are still at the expelling position. The plunger advances under the action of the weight 18, forcing the material into the receiver and pressing back the pistons 32 until these latter are arrested by the arms 39. The material is then compressed, and the receivers begin to turn downward, the pistons 32, moved by the action of rods 33, rollers 36, and arms 39, expel the materials from the receivers, the plate 17 is drawn back, and the plunger recedes to take in more material. The action then repeats itself, and each time a number of lumps of plastic material of adjusted weight (four in this case) are discharged from the machine. If the weights are found to be incorrect, the disks 42 must be adjusted in order to draw in or move out the curved rods 39, and thus reduce or increase the extent of movement of the pistons 32.

Figs. 7 and 8 represent a modification the object of which is to provide a means for securing a uniform pressure in the compressing stroke without the use of the weight 18, and also for preventing damage to the machine in the case of a stone or other foreign body entering with the plastic material. The dividing and compressing of the materials is effected in the same manner in this machine as in the one described above, and consequently only the actual modification is shown. The shaft 53, which corresponds to shaft 6 of the other machine, has a crank-disk 54 on it. A cylinder and chest 55 56 are mounted in suitable brackets or the like on the frame 1, and the chest, which is open above, is arranged to communicate with both ends of the cylinder 55 by means of ports 57. In the cylinder 55 are two pistons 58 58', one of which, 58', is connected by piston-rod 59 and connecting-rod 60 to the pin 61 of crank-disk 54, and the other, 58, by a rod 62 to a rocking lever 63, the connection being made by any suitable pin-and-slot or sliding device. The rocking lever rocks on a center 64 and at its upper end has a rod 65 connected to it. This rod 65 corresponds to link 13, Fig. 1, and operates the plunger in exactly the same manner as in the first-described arrangement, except that it serves both for pushing it forward and drawing it back, the weight 18 being dispensed with. On the top of the cylinder 55 are two conical valve-openings, Fig. 8, one of which, 66, expands inward and the other, 67, outward. The conical plugs of these valves are respectively connected to weighted lever-arms 68 69, which are pivoted on a post 70, the one between its weight 71 and plug-rod 74 and the other beyond the plug-rod 73 and at the opposite end to weight 72. The cylinder and chest are filled with a liquid above the level of the cylinder-ports, as shown in Fig. 7. Stuffing-boxes 75 76 are provided at the ends of the cylinder where the rods 59 62 pass through them. The action is as follows: The liquid between the pistons 58 and 58' can never reach a higher pressure than that of the valve 67. Consequently during the middle of the stroke of the crank-disk, when the speed is greatest, liquid will escape by valve 67 if the pressure exceeds that allowed by the counterweight, and thus the pressure on the plastic material is always kept down to a predetermined level. The same action will take place on the return stroke when the plunger is drawn back by the suction of the liquid between the pistons 58 58', the liquid entering by valve 66 during the quickest part of the crank movement or after the plunger has reached the end of its course, in order to compensate for that lost in the outstroke. The counterweights 71 72 must, of course, be so adjusted that the required pressure and pull will be exerted before liquid escapes or enters, so that the plunger will always be moved so long as the pressure which it has to overcome or the pull which it has to exert does not exceed the limit. If any obstruction should find its way into the machine, this device will also prevent the possibility of serious damage being done to the essential parts of the machine.

I declare that what I claim is—

1. In a machine for dividing plastic material, the combination with a frame and means for feeding the material, of a plurality of receivers, a frame for said receivers, means for rocking said frame and receivers, a piston in each receiver, and means whereby said pistons are moved outward while the receivers are being rocked downward.

2. In a machine for dividing plastic material, the combination with a frame and means for feeding the material, of a plurality of receivers, a frame for said receivers, means for rocking said frame and receivers, a piston in each receiver, rods connected to said pistons, a curved rod attached to the frame in a plane with each piston-rod, means on said piston-rods for bearing against said curved rods, and means for adjusting said curved rods, whereby the length of movement of said pistons in the receivers may be adjusted.

3. In a machine for dividing plastic material, the combination with a frame and means for feeding the material, of a plurality of receivers, means for imparting an intermittent rocking motion to said receivers, a piston in each receiver, a curved rod behind each receiver, means connected to each piston and adapted to bear on one of said curved rods, a pivoting-axis for the upper ends of said curved rods, two disks, means for mounting said disks in the frame of the machine, a rod connecting eccentrically the faces of said disks, links on said rod connecting it with the ends of said curved arms, and turning and locking means for said disks, whereby the positions of said curved arms may be simultaneously altered and the extent of movement of said pistons adjusted.

4. In a machine for dividing plastic material, the combination with a frame and means for feeding the material, of a plurality of receivers, means for intermittently rocking said receivers, a curved plate adapted to close the aperture of the feeding means while said receivers are being rocked, means for expelling the material from said receivers and means for operating said expelling means during said rocking movement.

5. In a machine for dividing plastic material, the combination with a frame, a chamber therein, a hopper connected to said chamber, a plunger in said chamber, and a plate adapted to cut off communication between said chamber and said hopper, of a plurality of receivers in front of said chamber, means for rocking said receivers, a cheek-plate at each side of the row of said receivers, an eccentric groove in each cheek-plate and means connected to the plate which lies between the hopper and chamber, and adapted to engage in the grooves in the cheek-plate aforesaid, whereby said plate is moved between the hopper and chamber while the receivers are rocking upward, and is drawn back while the receivers are rocking downward.

6. In a machine for dividing plastic material, the combination with a frame, a chamber, a plunger adapted to work in said chamber, means for feeding material to said chamber, and means for receiving the material from said chamber, of a continuously-rotating element, hydraulic means for transmitting motion from said continuously-rotating element to said plunger, and two counterbalanced valves connected to said hydraulic means, one of which valves is adapted to open inward and the other outward, whereby the pressure or pull on said plunger transmitted from said continuously-rotating element through said hydraulic means is kept within predetermined limits.

In witness whereof I have hereunto signed my name, this 11th day of November, 1902, in the presence of two subscribing witnesses.

JOHN CALLOW.

Witnesses:
G. C. DYMOND,
HUBERT A. GILL.